(12) United States Patent
Kalje et al.

(10) Patent No.: US 8,878,501 B2
(45) Date of Patent: Nov. 4, 2014

(54) MULTI-PHASE POWER BLOCK FOR A SWITCHING REGULATOR FOR USE WITH A SINGLE-PHASE PWM CONTROLLER

(75) Inventors: Nitin Kalje, Saratoga, CA (US); Mansour Izadinia, Cupertino, CA (US)

(73) Assignee: Micrel, Inc., San Jose, CA (US)

(*) Notice: Subject to any disclaimer, the term of this patent is extended or adjusted under 35 U.S.C. 154(b) by 450 days.

(21) Appl. No.: 13/434,708

(22) Filed: Mar. 29, 2012

(65) Prior Publication Data

US 2013/0057239 A1    Mar. 7, 2013

Related U.S. Application Data

(60) Provisional application No. 61/530,396, filed on Sep. 1, 2011, provisional application No. 61/531,567, filed on Sep. 6, 2011.

(51) Int. Cl.
*G05F 1/59* (2006.01)
*H02J 1/10* (2006.01)
*H02M 3/158* (2006.01)

(52) U.S. Cl.
CPC ........ *H02M 3/1584* (2013.01); *H02J 2001/106* (2013.01); *H02M 2003/1586* (2013.01)
USPC .......................................... 323/272; 323/285

(58) Field of Classification Search
USPC .................. 323/271, 272, 282, 285
See application file for complete search history.

(56) References Cited

U.S. PATENT DOCUMENTS

| | | | |
|---|---|---|---|
| 6,232,754 B1 * | 5/2001 | Liebler et al. | ................. 323/272 |
| 6,366,069 B1 | 4/2002 | Nguyen et al. | |
| 6,414,469 B1 | 7/2002 | Zhou et al. | |
| 6,683,441 B2 | 1/2004 | Schiff et al. | |
| RE38,454 E | 3/2004 | Walters et al. | |

(Continued)

FOREIGN PATENT DOCUMENTS

| | | |
|---|---|---|
| CN | 1845036 | 10/2006 |
| CN | 101783581 | 7/2010 |
| TW | 200810335 | 2/2008 |

OTHER PUBLICATIONS

"Multiphase Converter ICS Solve Powering Requirements for Microprocessors," Power Electronics Technology, Jan. 1, 2009, article, 2 pages.

(Continued)

*Primary Examiner* — Jeffrey Sterrett
(74) *Attorney, Agent, or Firm* — Van Pelt, Yi & James LLP

(57) ABSTRACT

A multi-phase power block for a switching regulator includes a phase control circuit, N power cells and a current sharing control circuit. The phase control circuit is configured to receive a single phase PWM clock signal and generate N clock signals in N phases. Each of the N power cells includes a pair of power switches, gate drivers, a control circuit receiving one of the N clock signals and generating gate drive signals for the gate drivers, and an inductor. The current sharing control circuit is configured to assess the inductor current at the inductor of the N power cells and to generate duty cycle control signals for the N power cells. The duty cycle control signals are applied to the control circuits to adjust the duty cycle of one or more clock signals supplied to the power cells to balance a current loading among the N power cells.

22 Claims, 5 Drawing Sheets

(56) References Cited

U.S. PATENT DOCUMENTS

| | | |
|---|---|---|
| 6,803,750 B2 | 10/2004 | Zhang |
| 6,836,103 B2 * | 12/2004 | Brooks et al. ............... 323/282 |
| 6,850,045 B2 * | 2/2005 | Muratov et al. ............. 323/272 |
| 6,912,144 B1 | 6/2005 | Clavette |
| 7,107,468 B2 | 9/2006 | Pullen et al. |
| 7,282,898 B2 * | 10/2007 | Condito ....................... 323/272 |
| 7,301,314 B2 | 11/2007 | Schuellein et al. |
| 7,394,233 B1 * | 7/2008 | Trayling et al. ............. 323/272 |
| 7,592,787 B2 * | 9/2009 | Qui et al. ..................... 323/272 |
| 7,733,675 B2 | 6/2010 | Wu et al. |
| 7,772,811 B1 * | 8/2010 | Jain et al. .................... 323/224 |
| 7,852,053 B2 * | 12/2010 | Martin et al. ................ 323/272 |
| 8,203,321 B2 * | 6/2012 | Liang et al. .................. 323/282 |
| 8,207,711 B2 | 6/2012 | Crawford et al. |
| 8,232,782 B2 * | 7/2012 | Houston et al. .............. 323/272 |
| 8,330,438 B2 * | 12/2012 | Sreenivas ..................... 323/272 |
| 8,330,439 B2 * | 12/2012 | Wu ............................... 323/272 |
| 8,471,542 B2 * | 6/2013 | Lipiansky et al. ............ 323/283 |
| 8,558,523 B2 * | 10/2013 | Qiu et al. ..................... 323/272 |
| 2008/0089101 A1 | 4/2008 | Schuellein |
| 2010/0315051 A1 | 12/2010 | Maher |
| 2011/0221409 A1 * | 9/2011 | Nakamura et al. ........... 323/272 |
| 2013/0057239 A1 * | 3/2013 | Kalje et al. ................... 323/271 |

OTHER PUBLICATIONS

Yungtaek Jang, "Multi-Phase Buck Converters with Extended Duty Cycle," Paper, 2006 IEEE, pp. 38-44.

\* cited by examiner

US 8,878,501 B2

MULTI-PHASE POWER BLOCK FOR A SWITCHING REGULATOR FOR USE WITH A SINGLE-PHASE PWM CONTROLLER

CROSS-REFERENCE TO RELATED APPLICATIONS

This application claims the benefit of U.S. Provisional Patent Application Ser. No. 61/530,396, filed on Sep. 1, 2011, and U.S. Provisional Patent Application Ser. No. 61/531,567, filed on Sep. 6, 2011, which applications are incorporated herein by reference in their entireties.

FIELD OF THE INVENTION

The invention relates to switching regulators and, in particular, to a multi-phase switching regulator power block.

DESCRIPTION OF THE RELATED ART

Switch mode power supplies or switching regulators, also referred to as DC to DC converters, are often used to convert an input supply voltage to a desired output voltage at a voltage level appropriate for the internal circuitry of an integrated circuit. For example, a 5 volts supply voltage provided to an integrated circuit may need to be reduced to 2.8 volts on the IC chip to operate the internal circuitry on the chip. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

The operation of the conventional switching regulator is well known and is generalized as follows. A conventional step down switching regulator includes a pair of power switches which are turned on and off to regulate an output voltage to be equal to a reference voltage. More specifically, the power switches are alternately turned on and off to generate a switching output voltage at a switching output node, also referred to as the switch node. The switch node is coupled to an LC filter circuit including an output inductor and an output capacitor to generate an output voltage having substantially constant magnitude. The output voltage can then be used to drive a load.

More specifically, the pair of power switches is often referred to as including a "high-side power switch" and a "low-side power switch." The high-side power switch is turned on to apply energy to the output inductor of the output filter circuit to allow the current through the inductor to build up. When the high-side power switch is turned off, the voltage across the inductor reverses and the current through the inductor reduces during this cycle. This insures that the inductor current ripples above and below the nominal output current. A relatively constant output voltage is maintained by the output capacitor. The low-side power switch is turned on and off for synchronous control operation.

FIG. 1 is a schematic diagram of a conventional switching regulator. Referring to FIG. 1, a switching regulator 1 includes a switching regulator controller 10 with a pair of power switches S1 and S2. Power switches S1 and S2 are alternately turned on and off to generate a switching output voltage $V_{SW}$ at a switch node (SW) 22. The switching output voltage $V_{SW}$ is directly coupled to an LC filter circuit including an output inductor L1 and an output capacitor $C_{OUT}$ to generate a regulated output voltage $V_{OUT}$ at a node 26 having a substantially constant magnitude. The output voltage $V_{OUT}$ can then be used to drive a load 30 whereby switching regulator 1 provides the load current $I_{LOAD}$ to maintain the output voltage $V_{OUT}$ at a constant level.

Switching regulator 1 includes a feedback control circuit to regulate the energy transfer to the LC filter circuit to maintain a constant output voltage within the desired load limits of the circuit. More specifically, the feedback control circuit causes power switches S1 and S2 to turn on and off to regulate the output voltage $V_{OUT}$ to be equal to a reference voltage $V_{REF}$ or to a voltage value related to the reference voltage $V_{REF}$. In the present embodiment, a voltage divider including resistors R1 and R2 is used to divide down the output voltage $V_{OUT}$ which is then fed back to the switching regulator controller 10 as a feedback voltage $V_{FB}$ on a feedback node 28. The feedback voltage $V_{FB}$ is compared with the reference voltage $V_{REF}$ at an error amplifier 12. The difference between the feedback voltage $V_{FB}$ and the reference voltage $V_{REF}$ is coupled to a control circuit 14 to generate control voltages for the power switches based on a switching regulator control scheme. The control voltages are then provided to a gate drive circuit 16 to generate gate drive signals for the power switches S1 and S2. The gate drive signal for the high-side power switch S1 is coupled to a high-side driver circuit 18 while the gate drive signal for the low-side power switch S2 is coupled to a low-side driver circuit 20. Driver circuits 18, 20 convert the respective gate drive signals to gate drive voltages appropriate for turning on and off the respective power switches.

Some switching regulators employ pulse width modulation (PWM) to control the duty cycle of the power switches S1 and S2. That is, the control circuit 14 controls the on-time of power switches S1 and S2 at a fixed frequency by adjusting the pulse width. Conventional switching regulators employing PWM control can be configured using a PWM controller driving a power block, as shown in FIG. 2. As shown in FIG. 2, a PWM controller 52 generates a PWM clock signal for driving a power block 50. In the illustration in FIG. 2, the power block 50 is a single phase power block and the PWM controller generates a single phase PWM clock signal which is used to drive the power switches S1 and S2 to regulate the output voltage $V_{OUT}$.

Multi-phase switching regulators and multi-phase converters are known in the art. The conventional multi-phase converters rely on a multi-phase PWM controller generating clock signals with different phase shifts for each phase of the power block cells. Multi-phase converters implemented using multi-phase PWM controller are more complicated and more costly.

SUMMARY OF THE INVENTION

According to one embodiment of the present invention, a multi-phase power block for a switching regulator where the switching regulator is configured to receive an input voltage and to generate a regulated output voltage includes a phase control circuit, N power cells and a current sharing control circuit. The phase control circuit is configured to receive a single phase pulse-width modulation (PWM) clock signal and generate N clock signals in N phases. Each of the N power cells includes a pair of power switches connected in series between the input voltage and a ground potential and configured to generate a switching output voltage at a common node between the power switches, one or more gate drivers configured to drive gate terminals of the power switches, a control circuit configured to receive one of the N clock signals and to generate gate drive signals for the gate drivers, and an inductor having a first terminal receiving the switching output voltage and a second terminal providing an inductor current. The second terminals of the inductors of the N power cells are connected together to an output node. The current sharing control circuit is configured to assess the inductor current at the inductor of each of the N power cells and to generate duty cycle control signals for each of the N power cells. The duty cycle control signals are applied to the control circuits of the N power cells to adjust the duty cycle of one or more clock signals supplied to the power cells to balance a current loading among the N power cells.

According to another aspect of the present invention, a method in a switching regulator configured to receive an input voltage and to generate a regulated output voltage includes receiving a single phase pulse-width modulation (PWM) clock signal; generating N clock signals in N phases from the single phase PWM clock signal; providing the N clock signals in N phases to N power cells, each power cell receiving one phase of the N clock signal; generating at each power cell a switching output voltage according to the clock signal provided to the power cell; generating an inductor current at each power cell in response to the switching output voltage; coupling the inductor currents of the N power cells to an output node; measuring the inductor current of each power well; and adjusting the duty cycle of one or more clock signals provided to the N power cells to balance a current loading among the N power cells.

The present invention is better understood upon consideration of the detailed description below and the accompanying drawings.

DETAILED DESCRIPTION OF THE PREFERRED EMBODIMENTS

In accordance with the principles of the present invention, a multi-phase power block for a switching regulator incorporates multiple power cells, a phase control circuit and a current sharing control circuit. A salient feature of the multi-phase power block is that the multi-phase power block is configured to receive a single phase PWM clock signal so that the multi-phase power block enables multi-phase switching regulator operation using a single-phase PWM controller. The multi-phase power block does not require expensive and complex multi-phase PWM controller. Rather, the multi-phase power block can be coupled with commercially available single-phase PWM controller to realize multi-phase switching regulator operation. A switching regulator configured using the multi-phase power block and a single-phase PWM controller reaps the benefits of multi-phase switching regulator operation without the cost and complexity of a multi-phase PWM controller.

In embodiments of the present invention, the multi-phase power block implements leading/trailing clock edge modulation to balance the current load between the power cells to achieve balanced current sharing between the different phases of the power cells.

In the present description, a "power block" refers to circuitry of a switching regulator performing the power switching function and generally includes at least the power switches of the switching regulator. In the present description, a "power block" refers to elements of the switching regulator including the power switches, the gate drivers, the inductor and some control circuits, such as the gate drive circuits. Furthermore, in some embodiments, a power block may also include the output capacitor where the inductor and the output capacitor form an output filter circuit. In other embodiments, a "power block" may refer to only the power switches, the gate drivers and some control circuits. These elements may or may not be formed on a single integrated circuit. For instance, the gate drive circuit, the gate drivers, the power switches may be formed on an integrated circuit while the inductor and the capacitor are discrete components. In some embodiments, the elements of the power block are co-packaged into a single integrated circuit package. A single-phase power block includes a single pair of power switches and associated drivers. A multi-phase power block includes multiple power cells where each power cell includes at least a single pair of power switches and associated drivers. The configuration of the multi-phase power block and power cells will be described in more detail below.

Figure 1:
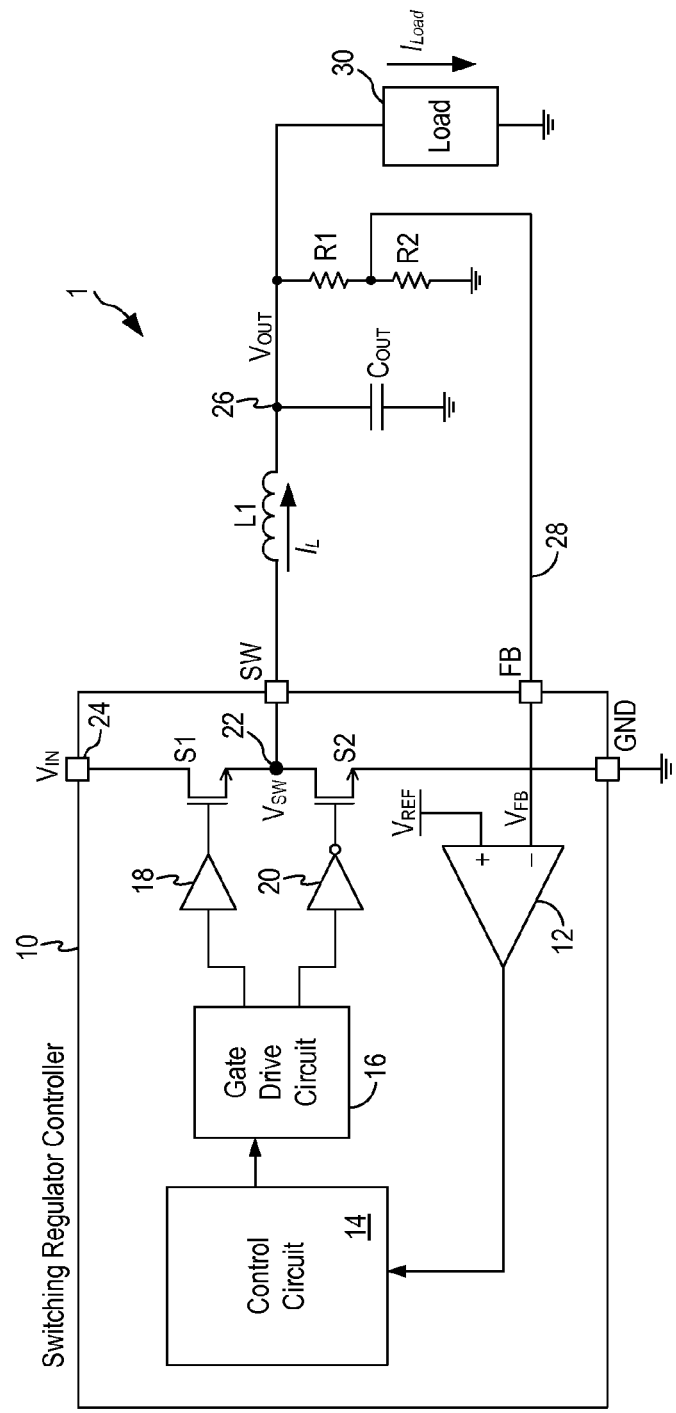
FIG. 1 is a schematic diagram of a conventional switching regulator.
Figure 2:
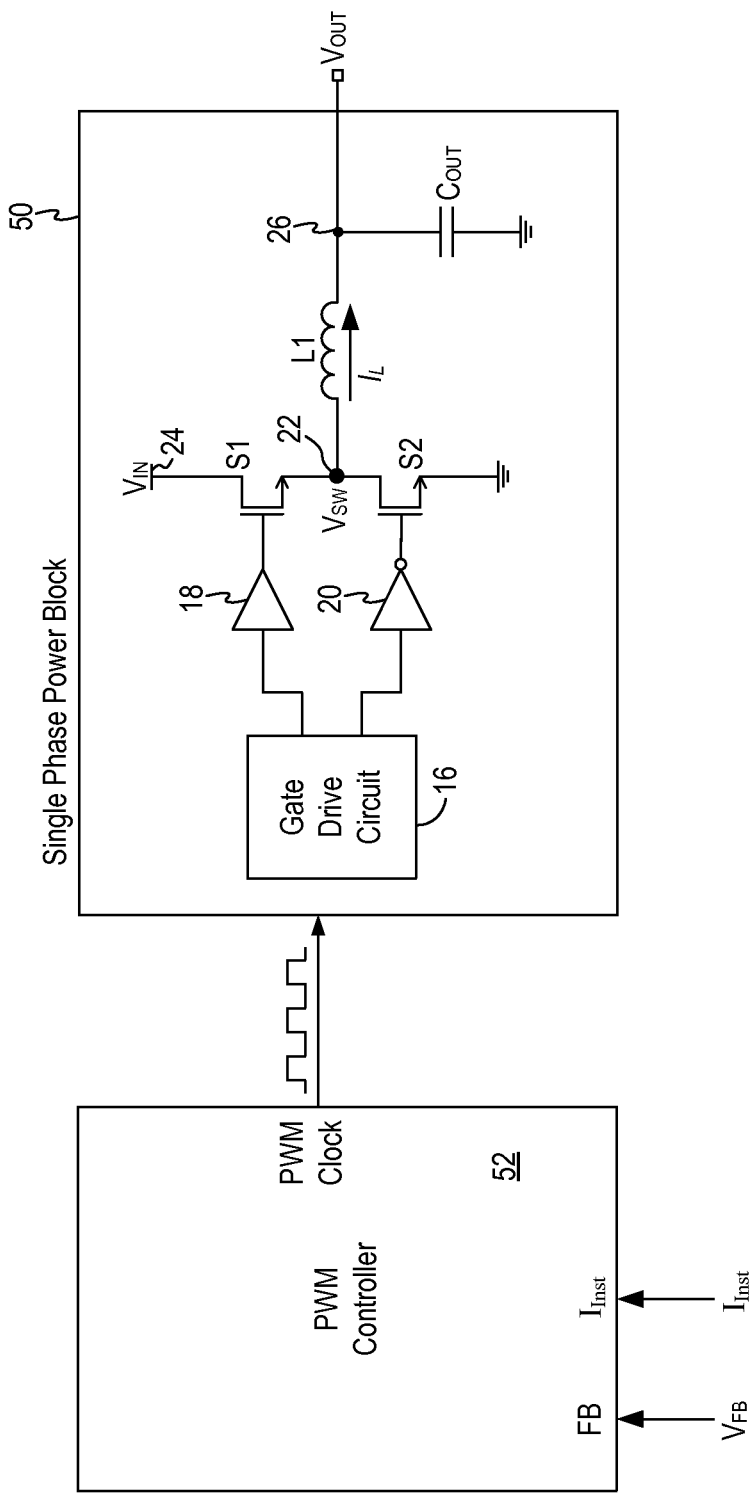
FIG. 2 illustrates a configuration of a conventional switching regulator including a single phase PWM controller and a single phase power block.
Figure 3:
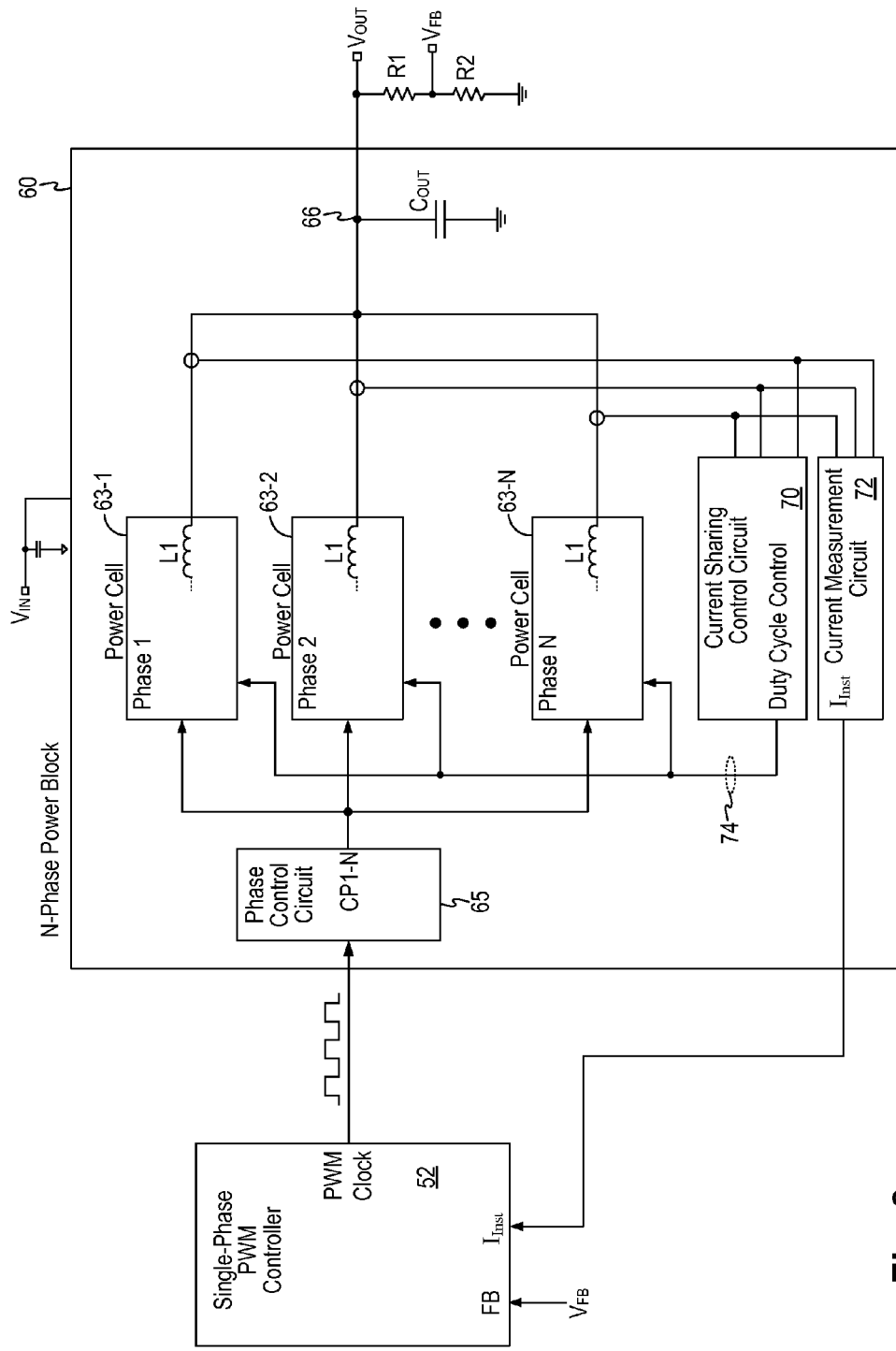
FIG. 3 is a schematic diagram of an N-phase power block according to one embodiment of the present invention.

FIG. 3 is a schematic diagram of an N-phase power block according to one embodiment of the present invention. Referring to FIG. 3, an N-phase power block 60 includes a phase control circuit 65, N power cells 63-1 to 63-N for clock phase 1 to clock phase N, a current sharing control circuit 70 and an output capacitor $C_{OUT}$. The N-phase power block 60 is driven by a single-phase PWM controller 52 providing a single phase PWM clock signal. The PWM controller 52 and the N-phase power block 60 form a multi-phase switching regulator or multi-phase DC-to-DC converter. In the feedback control loop of the switching regulator, PWM controller 52 receives a feedback voltage $V_{FB}$ indicative of the output voltage $V_{OUT}$ and an inductor current value $I_{inst}$ indicative of the instantaneous inductor current at the power cells. The PWM controller 52 generates the PWM clock signal having certain duty cycles for controlling the power switches so as to regulate the output voltage at the desired value.

In embodiments of the present invention, the multi-phase power block includes two or more power cells 63 where each power cell corresponds to one phase of the multi-phase power block. In the embodiments of the present invention, each power cell 63 includes a gate drive control circuit, a pair of gate drivers, a pair of power switches, and an inductor. The power cells are connected in parallel to provide currents to a common output node 66 to which the output capacitor $C_{OUT}$ is connected. Each of the N power cells 63-1 to 63-N provides an inductor current to the output node 66 according to the clock phase driving the power cell. In other embodiments of the present invention, the inductor in each power cell may be formed outside of power cell or outside of the power block. In that case, a single inductor may be coupled to an output node to receive the switching output voltage from the N power cells.

The N-phase power block can be configured for use with different switching regulator control schemes. In embodiments of the present invention, the N-phase power block is used with a switching regulator implementing a current-mode control, voltage mode control, hysteretic current mode, or average current mode control. Other switching regulator control schemes are also possible.

In N-phase power block 60, the phase control circuit 65 receives the single phase PWM clock signal from the PWM controller 52 and generates clock phases 1 to N (CP1 to CPN) to drive each phase of the power cells. In embodiments of the present invention, clock phases CP1 to CPN are divided down clock signals of the single phase PWM clock signal. In some embodiments, the N-phase power block is implemented as a phase-locked loop (PLL) circuit. Furthermore, in embodiments of the present invention, the phase control circuit 65 implements duty cycle extension to increase the duty cycle of each clock phases 1 to N generated from the single phase PWM clock signal, as will be described in more detail below.

In N-phase power block 60, the current sharing control circuit 70 receives sensed inductor current from each power cell 63 and generates duty cycle control signals on bus 74 for each power cell. The duty cycle control signals on bus 74 are generated to modulate the clock edges of each power cell 63 in order to balance the current sharing among the power cells 63-1 to 63-N. In embodiments of the present invention, the current sharing control circuit 70 implements leading/trailing clock edge modulation whereby the duty cycle control signals modulate the leading and/or trailing clock edge of one or more of the clock phases CP1 to CPN to precisely adjust the duty cycle of each power cell. The leading and trailing clock edges are sometimes referred to as the rising and falling clock edges of a clock signal. In this manner, current sharing between the power cells 63-1 to 63-N can be balanced to split the load currents equally between the N phases and to realize optimal multi-phase operation.

In embodiments of the present invention, the N-phase power block 60 further includes a current measurement circuit 72 configured to generate an instantaneous inductor current value $I_{inst}$ which is provided to the single phase PWM controller 52 for current mode control or current limit control. In some embodiments, the instantaneous inductor current value $I_{inst}$ measures the maximum inductor current of the N power cells 63-1 to 63-N at a given instant of time. In embodiments of the present invention, the current measurement circuit measures the instantaneous inductor current by sensing the currents in the inductors L1 of the power cells. In other embodiments, the current measurement circuit measures the instantaneous inductor current by sensing the currents in the power switches of the power cells.

Figure 4:
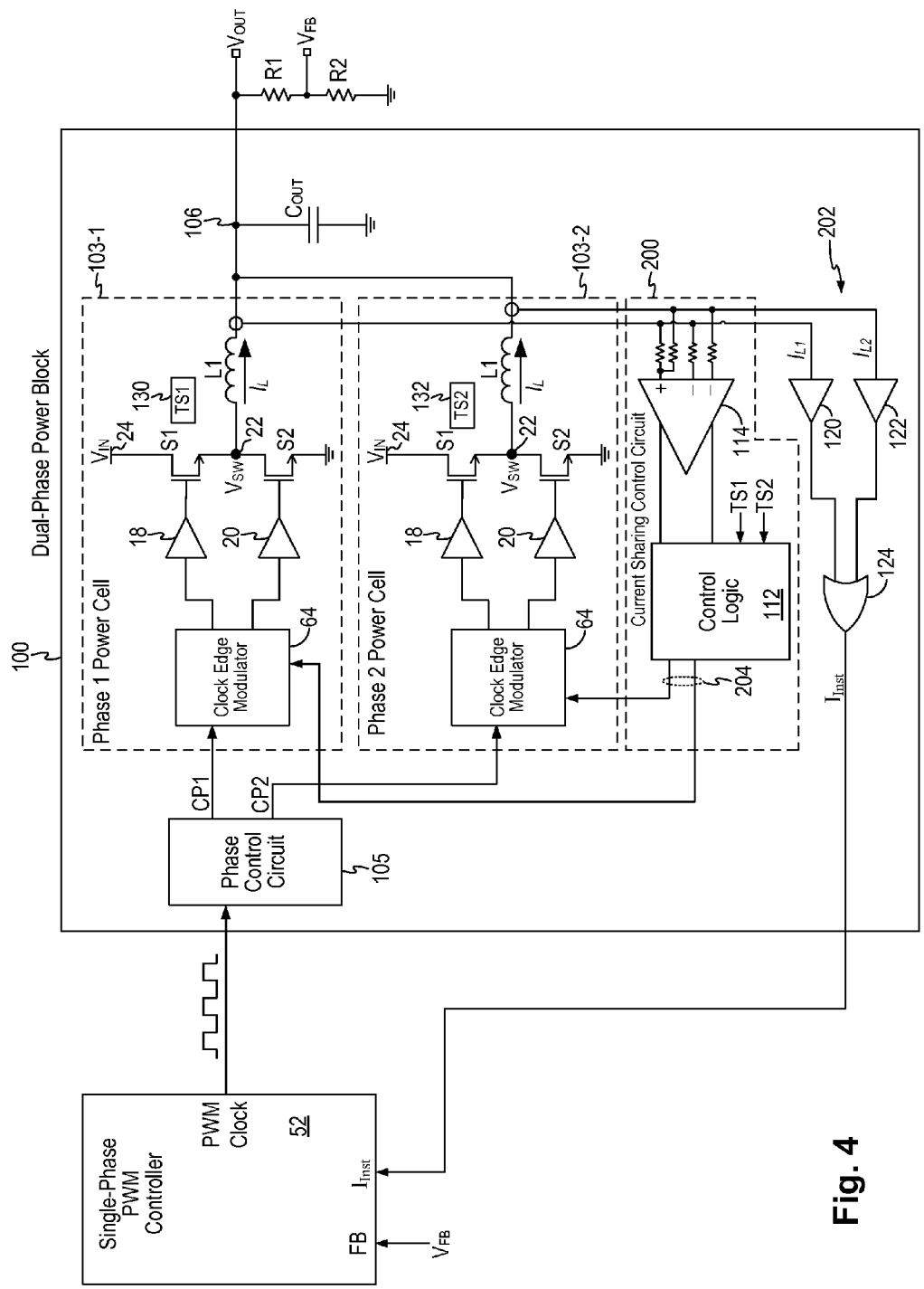
FIG. 4 is a schematic of a dual-phase power block according to one embodiment of the present invention.

FIG. 4 is a schematic of a dual-phase power block according to one embodiment of the present invention. Referring to FIG. 4, a dual-phase power block 100 includes two power cells 103-1 and 103-2 for two-phase switching regulator operation. In the present embodiment, each power cell 103 includes a clock edge modulator 64 driving gate drivers 18 and 20. Gate drivers 18 and 20 in turn drive respective power switches S1 and S2. Power switches S1 and S2 are turned on and off to charge or discharge current in an inductor L1. In the present embodiment, power switches S1 and S2 are both N-type MOSFET devices. In other embodiments, power switch S1 may be implemented using a P-type MOSFET device with the appropriate reversal in control voltage polarity.

The phase 1 power cell 103-1 and the phase 2 power cell 103-2 in dual-phase power block 100 are connected in parallel to provide currents to a common output node 106 to which the output capacitor $C_{OUT}$ is connected. The two power cells provide current to the output node 106 according to the clock phase driving the power cell.

Figure 5:
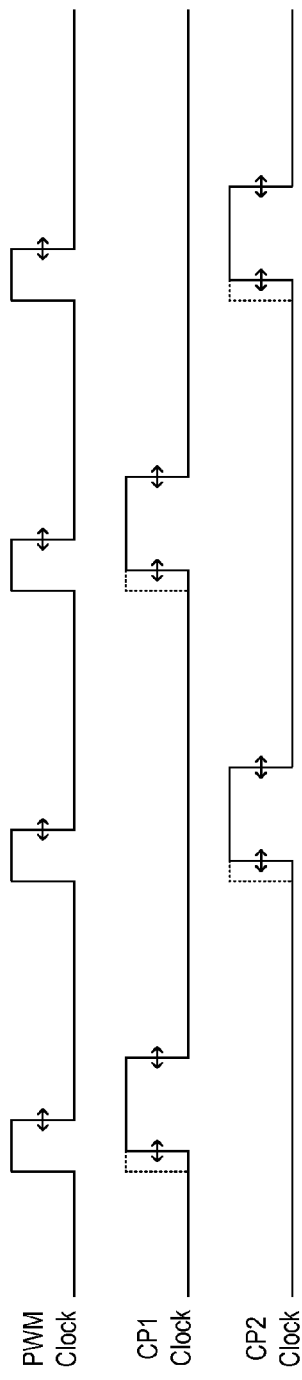
FIG. 5 illustrates the PWM clock signal and the clock phases for the dual phase power block of FIG. 4 according to one embodiment of the present invention.

Dual-phase power block 100 includes a phase control circuit 105 receiving the single phase PWM clock signal from the single phase PWM controller 52. The phase controller circuit 105 generates clock phase signals CP1 and CP2 having different clock phases. FIG. 5 illustrates the PWM clock signal and the clock phases for the dual phase power block of FIG. 4 according to one embodiment of the present invention. Referring to FIG. 5, for a PWM clock having a fixed frequency and varying duty cycle, a clock phase CP1 and a clock phase CP2 can be generated by dividing down the PWM clock signal. For instance, the clock phase CP1 switches only at alternate clock pulses of the PWM clock signal and the clock phase CP2 switches at the other alternate clock pulses of the PWM clock signal.

In embodiments of the present invention, the phase control circuit 105 implements duty cycle extension to extend the duty cycle of the clock phase signals CP1 and CP2. As shown in FIG. 5, the duty cycle of the clock phase signals CP1 and CP2 is extended as compared to the single phase PWM clock signal. The clock edge modulator 64 in each power cell 103 receives the respective clock phase signal CP1 or CP2 from phase control circuit 105. The clock edge modulator 64, in response to a duty cycle control signal generated by a current sharing control circuit, adjusts the on time of the clock phase signal CP1 or CP2. More specifically, the clock edge modulator 64 adjusts the leading and/or trailing clock edges (rising and/or falling clock edges) of the clock phase supplied to a power cell 103 to adjust the duty cycle for each power cell. In this manner, current sharing among the power cell is adjusted to realize balanced current sharing. According to embodiments of the present invention, the phase control circuit 105 extends the duty cycle of the clock phases while the clock edge modulator 64 provides fine tune control of the duty cycle for each power cell. On the other hand, the PWM controller 52 controls the overall duty cycle of the dual-phase power block to regulate the output voltage by controlling the single phase PWM clock. More specifically, the PWM controller 52 adjusts the falling edge of the PWM clock signal to adjust the duty cycle of the dual-phase power block. The clock edge modulator 64 in each power cell of the power block 100 adjusts the on-time of the clock phase signal by adjusting the rising and/or falling edges of the clock phase signal to fine tune the duty cycle for that power cell.

Returning to FIG. 4, dual-phase power block 100 includes a current sharing control circuit 200 for generating the duty cycle control signals for driving the clock edge modulator 64 in each power cell. The current sharing control circuit 200 includes an error amplifier 114 configured to measure the current loading of each power cell. Current amplifier 114 measures the average current of the power cells by adding the inductor currents of all of the power cells and averaging the total inductor current. The individual inductor current is then compared to the average current to determine the current loading at each power cell. A control logic block 112 receives the current comparison results and generates the duty cycle control signals on a bus 204 to drive the clock edge modulators 64 in each power cell. In some embodiments, the current comparison results are used to determine the desired adjustment to the duty cycle for each power cell and the clock edge modulator 64 adjusts the on time of the clock phase signal CP1/2 to fine tune the duty cycle for the power cell.

Dual-phase power block 100 may include other control circuits to facilitate the feedback control of the switching regulator. In the present embodiment, dual-phase power block 100 includes a current measurement circuit 202 configured to measure the instantaneous inductor current value $I_{inst}$ of the power cells 103-1 and 103-2. In the present embodiment, the current measurement circuit includes a pair of current amplifiers 120, 122 and an OR gate 124. The current amplifiers 120, 122 are coupled to receive the inductor current for each power cell and the amplified inductor currents are coupled to the OR gate 124. The instantaneous inductor current value $I_{inst}$ thus measured is provided to the single phase PWM controller 52 for current mode control or current limit control. In embodiments of the present invention, the current measurement circuit measures the instantaneous inductor current by sensing the currents in the inductors L1 of the power cells or by sensing the currents in the power switches of the power cells.

In the above-described embodiments, the inductors L1 in the power cells are independent or discrete inductors. In other embodiments, the inductors L1 for the power cells can be magnetically-coupled. When the inductors L1 of the power cells are formed using magnetically-coupled inductors, the magnetic coupling could be in-phase or out-of-phase, such as 180° out-of-phase. The benefit of using coupled inductor is reduced component count and more efficient use of space.

In the present embodiment, each power cell further includes a temperature sensor TS1 and TS2 (130, 132). The temperature sensors measure the local temperature of the power switches in each power cell. The local temperatures measured by the temperatures sensors TS1 and TS2 at each power cell are provided to the control logic 112 in the current sharing control circuit 200 for use in determining current sharing among the power cells. If a particular power cell experiences a large temperature value, the control logic 112 may reduce the duty cycle for that power cell to allow the power cell to cool down. More efficient operation can be realized by monitoring the local temperature at the power switches of the power cells.

A feedback voltage $V_{FB}$ may be generated by a voltage divider formed by resistors R1 and R2 coupled to the output voltage $V_{OUT}$. The feedback voltage $V_{FB}$ is provided to the PWM controller 52 to complete the feedback control loop for the switching regulator thus formed.

In summary, the salient features of the multi-phase power block of the present invention are as follows. First, the multi-phase power block of the present invention enables the use of a single phase PWM controller to drive the multi-phase power block to realize multi-phase switching regulator operation. The multi-phase power block of the present invention enables the use of existing single phase PWM controller to drive the multi-phase power block without the expense and complexity of providing a multi-phase PWM controller. The multi-phase power block of the present invention includes a phase control circuit to implement clock dividing function circuitry to realize the clock conversion operation needed to realize multi-phase operation.

Second, the multi-phase power block of the present invention implements leading/trailing clock edge modulation to regulate current sharing between the phases of the power cells.

Third, the multi-phase power block of the present invention includes a phase control function, such as a clock divider function, to reduce the PWM clock frequency to 1/N, for N power cells, while keeping the duty cycle of the PWM clock signal constant. In some embodiments, the phase control function also implements duty cycle extension.

Fourth, the multi-phase power block of the present invention enables a multi-phase switching regulator to be implemented to reap the benefits of multi-phase operation. Multi-phase switching regulator operation realizes increased efficiency and higher output current. Also, multi-phase switching regulator operation realizes higher switching frequency and therefore lower ripple current at the regulator output voltage. Lowering the ripple current also lower the capacitance requirement for the output/input capacitor.

Fifth, the multi-phase power block of the present invention realizes lower per-phase inductor current which in turn reduces the RMS loss by the square of the number of power cells. For example, for a dual-phase power block, the inductor current for each power cell is reduced by half while the power losses are reduced ¼ of the single phase power losses. Increased efficiency can be achieved without the need to lower the intrinsic Rdson for the power switches.

Sixth, when the output current is shared among the N power cells, the transient response of the switching regulator is also improved. More specifically, with the current sharing control loop operating at a higher frequency, the loop bandwidth of the converter increases significantly requiring lower output capacitance.

Finally, when the load current is split between the power switches in the N power cells, local heating of the power switches is reduced which allows the power switches to run cooler than in conventional power blocks. Cooler running power switches have lower Rdson and lower conduction losses.

Figure 6:
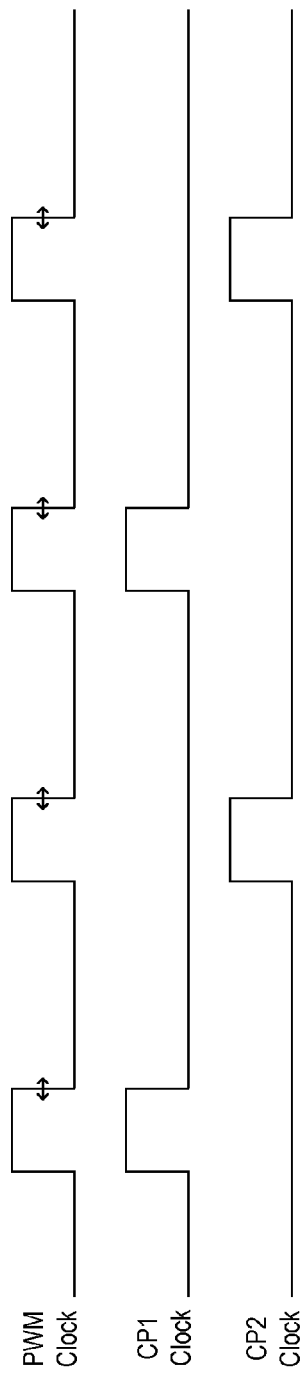
FIG. 6 illustrates the PWM clock signal and the clock phases for the dual phase power block of FIG. 4 according to an alternate embodiment of the present invention.

In the above-described embodiments, the N-phase power block implements duty cycle extension and balanced load current sharing. Load current balancing is realized by measuring the inductor current from each power cell and generating duty cycle control signals to modulate the clock edges of each power cell to balance the current sharing among the N power cells. In other embodiments, the PWM controller 52 is configured to adjust the duty cycle of the single phase PWM clock signal based on the feedback voltage signal $V_{FB}$ generated by the PWM error amplifier. FIG. 6 illustrates the PWM clock signal and the clock phases for the dual phase power block of FIG. 4 according to an alternate embodiment of the present invention. Referring to FIG. 6, the single phase PWM clock has its trailing clock edge adjusted in response to the feedback voltage signal $V_{FB}$ to extend the duty cycle of the power block. Meanwhile, the clock phases CP1 ad CP2 is generated based on the single phase PWM clock without further duty cycle extension. In this manner, instead of implementing duty cycle extension at each power cell, the PWM controller adjusts the duty cycle of the single phase PWM clock to keep the output voltage under regulation. The fine tune control to modulate the leading and trailing edges of the clock phases for load current balancing is still implemented.

The above detailed descriptions are provided to illustrate specific embodiments of the present invention and are not intended to be limiting. Numerous modifications and variations within the scope of the present invention are possible. The present invention is defined by the appended claims.

We claim:

1. A multi-phase power block for a switching regulator, the switching regulator being configured to receive an input voltage and to generate a regulated output voltage, the multi-phase power block comprising:
  a phase control circuit configured to receive a single phase pulse-width modulation (PWM) clock signal and generate N clock signals in N phases;
  N power cells, each power cell comprising a pair of power switches connected in series between the input voltage and a ground potential and configured to generate a switching output voltage at a common node between the power switches, one or more gate drivers configured to drive gate terminals of the power switches, a control circuit configured to receive one of the N clock signals and to generate gate drive signals for the gate drivers, and an inductor having a first terminal receiving the switching output voltage and a second terminal providing an inductor current, the second terminals of the inductors of the N power cells being connected together to an output node; and a current sharing control circuit configured to assess the inductor current at the inductor of each of the N power cells and to generate duty cycle control signals for each of the N power cells, the duty cycle control signals being applied to the control circuits of the N power cells to adjust the duty cycle of one or more clock signals supplied to the power cells to balance a current loading among the N power cells.

2. The multi-phase power block of claim 1, further comprising an output capacitor coupled between the output node and the ground potential to generate the regulated output voltage.

3. The multi-phase power block of claim 1, wherein the phase control circuit is configured to divide down the single phase PWM clock signal to generate N clock signals in N phases, the N clock signals having a clock frequency 1/N times the clock frequency of the single phase PWM clock signal.

4. The multi-phase power block of claim 3, wherein the phase control circuit comprises a phase-locked loop circuit.

5. The multi-phase power block of claim 1, wherein the current sharing control circuit generates the duty cycle control signals to modulate the rising and/or falling clock edges of the one or more clock signals supplied to the power cells to balance the current loading among the N power cells.

6. The multi-phase power block of claim 5, wherein the current sharing control circuit generates the duty cycle control signals to split the load current loading equally between the N power cells.

7. The multi-phase power block of claim 1, wherein the current sharing control circuit is configured to measure the average inductor current of the N power cells and to compare the inductor current of each power cell to the average inductor current to generate the duty cycle control signal for that power cell.

8. The multi-phase power block of claim 1, further comprising a plurality of temperature sensors configured to measure local temperatures of the power switches in each of the N power cells, the plurality of temperature sensors providing local temperature measurements to the current sharing control circuit, the current sharing control circuit being configured to generate the duty cycle control signals to balance the current loading among the N power cells in response to the local temperature measurements.

9. The multi-phase power block of claim 1, further comprising a current measurement circuit configured to generate an instantaneous inductor current value indicative of the maximum inductor current of the N power cells at a given instant of time.

10. The multi-phase power block of claim 9, wherein the instantaneous inductor current value is used by the switching regulator for current mode control or current limit control.

11. The multi-phase power block of claim 9, wherein the current measurement circuit measures the instantaneous inductor current by sensing the currents in the power switches of the power cells.

12. The multi-phase power block of claim 1, wherein the inductors in the N power cells are discrete inductors.

13. The multi-phase power block of claim 1, wherein the inductors in the N power cells are magnetically coupled inductors having a magnetic coupling that is in-phase or 180° out-of-phase.

14. The multi-phase power block of claim 9, wherein the single phase PWM clock signal is generated based on a feedback voltage signal indicative of the regulated output voltage and the instantaneous inductor current value.

15. A method in a switching regulator configured to receive an input voltage and to generate a regulated output voltage, the method comprising:
receiving a single phase pulse-width modulation (PWM) clock signal;
generating N clock signals in N phases from the single phase PWM clock signal;
providing the N clock signals in N phases to N power cells, each power cell receiving one phase of the N clock signal;
generating at each power cell a switching output voltage according to the clock signal provided to the power cell;
generating an inductor current at each power cell in response to the switching output voltage;
coupling the inductor currents of the N power cells to an output node;
measuring the inductor current of each power well; and
adjusting the duty cycle of one or more clock signals provided to the N power cells to balance a current loading among the N power cells.

16. The method of claim 15, wherein generating N clock signals in N phases from the single phase PWM clock signal comprises dividing down the single phase PWM clock signal to generate the N clock signals in N phases, the N clock signals having a clock frequency 1/N times the clock frequency of the single phase PWM clock signal.

17. The method of claim 15, wherein adjusting the duty cycle of one or more clock signals provided to the N power cells to balance a current loading among the N power cells comprises:
adjusting the rising and/or falling clock edges of the one or more clock signals provided to the N power cells to balance a current loading among the N power cells.

18. The method of claim 15, wherein adjusting the duty cycle of one or more clock signals provided to the N power cells to balance a current loading among the N power cells comprises:
measuring the average inductor current of the N power cells; and
comparing the inductor current of each power cell to the average inductor current to determine adjustments to be made to the duty cycle of the one or more clock signals.

19. The method of claim 15, further comprising:
measuring local temperatures of each of the N power cells; and
adjusting the duty cycle of the one or more clock signals to balance the current loading among the N power cells in response to the local temperature measurements.

20. The method of claim 15, further comprising:
generating an instantaneous inductor current value indicative of the maximum inductor current of the N power cells at a given instant of time.

21. The method of claim 15, further comprising:
extending the duty cycle of the N clock signals in N phases.

22. The method of claim 15, further comprising:
adjusting the duty cycle of the single phase PWM clock signal in response to an error signal to regulate the output voltage at the output node.

* * * * *